(12) United States Patent
Travers

(10) Patent No.: US 7,515,344 B2
(45) Date of Patent: Apr. 7, 2009

(54) BINOCULAR DISPLAY WITH IMPROVED CONTRAST UNIFORMITY

(75) Inventor: Paul J. Travers, Honeoye Falls, NY (US)

(73) Assignee: Vuzlx Corporation, Rochester, NY (US)

( * ) Notice: Subject to any disclaimer, the term of this patent is extended or adjusted under 35 U.S.C. 154(b) by 463 days.

(21) Appl. No.: 11/306,616

(22) Filed: Jan. 4, 2006

(65) Prior Publication Data

US 2007/0153374 A1 Jul. 5, 2007

(51) Int. Cl.
*G02B 27/14* (2006.01)
*G09G 5/00* (2006.01)

(52) U.S. Cl. .......................................... 359/630; 343/7

(58) Field of Classification Search ......... 359/629–634; 345/7–8
See application file for complete search history.

(56) References Cited

U.S. PATENT DOCUMENTS

| | | | |
|---|---|---|---|
| 5,373,857 A | 12/1994 | Travers et al. | |
| 6,150,998 A | 11/2000 | Travers et al. | |
| 6,181,367 B1 | 1/2001 | McGrew et al. | |
| 6,417,970 B1 | 7/2002 | Travers et al. | |
| 6,636,359 B2 | 10/2003 | Travers et al. | |
| 6,788,286 B2 | 9/2004 | Travers et al. | |
| 6,870,532 B2 | 3/2005 | Travers et al. | |
| 6,900,778 B1 * | 5/2005 | Yamamoto | 345/8 |
| 7,190,330 B2 | 3/2007 | Travers et al. | |
| 7,289,085 B2 * | 10/2007 | Adams et al. | 345/7 |
| 7,397,607 B2 | 7/2008 | Travers | |

* cited by examiner

*Primary Examiner*—Alicia M Harrington
(74) *Attorney, Agent, or Firm*—Stephen B. Salai, Esq.; Thomas B. Ryan, Patent Agent; Harter Secrest & Emery LLP

(57) ABSTRACT

A binocular display deals with an optical contrast imbalance problem between display screens manifest over a range of interpupillary distances by orienting contrast asymmetries between the display screens in opposite directions.

10 Claims, 4 Drawing Sheets

BINOCULAR DISPLAY WITH IMPROVED CONTRAST UNIFORMITY

FIELD OF THE INVENTION

This invention relates generally to binocular video displays and, more particularly, to such displays with improved optical contrast uniformity compared with existing devices that exhibit optical contrast irregularities.

BACKGROUND OF THE INVENTION

Conventional binocular displays present images to the left and right eyes of a user as created by left and right display screens. Optics relay images of the display screens, generally as virtual images, to the user's eyes. Such binocular displays are used in a wide variety of applications including, head, hand, table, or otherwise mounted displays for reproducing still or moving images in monoscopic or stereoscopic form.

One characteristic of such binocular displays that contributes or detracts from the comfort of the user is the relative optical contrast presented to the user's eyes from left and right display screens. If one of the user's eyes receives an image that has perceptively greater contrast than the image received by the user's other eye, the user may experience visual discomfort, headaches, or the like, and as a result, may be unable to use the binocular display for extended periods of time. This invention has, as one of its objects, a goal of improving contrast uniformity of such binocular displays.

It is a characteristic of certain display screens that the optical contrast varies substantially with the viewing angle. While display screens are generally thought to provide optimum contrast along an on-axis viewing direction (generally, normal to the surface of the display screen), some display screens produce optimal contrast at a slightly different viewing angle, for example twelve degrees from the on-axis direction. Moreover, the deviation from optimal contrast in some display screens is not symmetrical about the optimal viewing angle. That is, contrast may reduce gradually as the angle is increased in one direction and may decrease precipitously as the angle is increased in the opposite direction.

While it is possible to create a binocular display having the left and right display screens positioned so that uniform contrast is produced for users having a given interpupillary distance (IPD), the interpupillary distances of individual users tend to vary throughout populations of users. For example, most members of the adult population have interpupillary distances within a range from approximately 52 to 72 millimeters. The viewing angles presented to users' left and right eyes tend to vary in opposite directions with changes in the users' interpupillary distances (assuming as is ordinarily the case that the users' eyes remain evenly spaced from the center of the binocular display). It can now be appreciated that if the known binocular displays are set to produce equal contrast for an average interpupillary distance of, say, 61 millimeters, deviations from this spacing may not only produce reduced contrast but may also produce unequal changes in contrast for the left and right eyes, resulting in the physiological discomfort described above.

SUMMARY OF THE INVENTION

One or more of the preferred embodiments of this invention feature a binocular display with improved optical contrast uniformity that overcomes this problem. Asymmetric directionally sensitive contrast can be balanced between the left and right eyes of users, not only for users having a particular interpupillary distance (IPD) but also for users having different interpupillary distances, which are more or less than the average interpupillary distance intended for the binocular display. Reduced eyestrain, headaches, and other discomforts, as well as the possibility for extended viewing of binocular displays, are among the benefits of this invention.

Briefly stated in accordance with one aspect of the invention, a binocular display having improved contrast uniformity includes left and right display screens for the left and right eyes of a user, respectively. Each display screen has a characteristic contrast that varies with viewing angle as presented to a user's eyes through any desired intervening optics, the contrast being maximum at a first viewing angle and decreasing asymmetrically for viewing angles greater or lesser than the first viewing angle. The display screens are mounted with respect to the user such that the asymmetric variation in contrast with viewing angle trends opposite for the left and right display screens.

Although the viewing angles presented to users' left and right eyes tend to vary in opposite directions with changes in the users' interpupillary distances, with this invention, users' left and right eyes can experience a similar increase or decrease in contrast throughout a range of interpupillary distances. The two display screens can exhibit similar characteristic contrast, and one of the display screens can be rotated 180 degrees with respect to the other display screen to balance contrast over the range of interpupillary distances. Left and right signal sources are preferably coupled to the left and right display screens respectively, and the left and right signal sources are adapted to accommodate the relative rotation of the display screens so that the left and right signals produce right side up images on both the left and right display screens.

In accordance with another aspect of the invention, a binocular display includes left and right display screens mounted within a viewing device for viewing along respective viewing axes. Each of the display screens exhibits a directionally sensitive contrast that varies asymmetrically from a direction of peak contrast within a lateral plane that includes the respective viewing axes. The asymmetric contrasts exhibited by the left and right display screens are oriented in opposite directions within the lateral plane.

The left and right display screens can exhibit similar asymmetric contrasts, and one of the display screens can be rotated with respect to the other of the display screens to orient the asymmetric contrasts of the left and right display screens in opposite directions within the lateral plane. For example, one display screen can be rotated with respect to the other display screen to produce a substantially reverse (left-to-right, right-to-left) symmetry between the asymmetric contrasts exhibited by the two display screens.

In accordance with another aspect of the invention, a binocular display includes left and right display screens mounted within a viewing device for viewing along respective viewing axes. Each of the display screens exhibits a directionally sensitive contrast having a direction of peak contrast. The directions of peak contrast are inclined to the respective viewing axes within a lateral plane that includes the respective viewing axes. In addition, the directions of peak contrast are oriented in opposite directions about the respective viewing axes within the lateral plane.

The directionally sensitive contrast exhibited by the display screens can vary asymmetrically about the directions of peak contrast, and the display screens can be arranged so that the asymmetric contrasts exhibited by the left and right display screens are oriented in opposite directions within the lateral plane.

In accordance with yet another aspect of the invention, a binocular display includes left and right display screens mounted within a viewing device for viewing by corresponding left and right eyes of users. Both of the display screens have a predetermined top to bottom orientation, such as by factory specification, and exhibit a similar directionally sensitive contrast that varies asymmetrically with respect to a direction of peak contrast. One of the left and right display screens is rotated top to bottom with respect to the other of the display screens within the viewing device so that the asymmetric contrasts are oriented in different directions with respect to the left and right eyes of the users for reducing differences in contrast presented to the left and right eyes of the users over a range of different interpupillary distances.

Yet another aspect of the invention features a binocular display including first and second display screens mounted within a viewing device having first and second eyeboxes within which the respective first and second display screens are visible to users. The first and second display screens have first and second viewing axes directed toward the first and second eyeboxes. Each of the first and second display screens exhibits a direction of peak contrast that is inclined to the respective first and second viewing axes. The first display screen is oriented with respect to the second display screen so that the directions of peak contrast extend in different directions with respect to the first and second viewing axes to reduce contrast variations apparent between the different eyes of the users over a range of interpupillary distances.

The first display screen can be rotated with respect to the second display screen to orient the peak contrasts of the first and second displays in opposite directions. The contrast exhibited by the first and second display screens can be a directionally sensitive contrast that varies asymmetrically with respect to the direction of peak contrast. The asymmetric contrasts also preferably extend in different directions with respect to the left and right eyes of the users.

The directional contrast of the display screens can vary asymmetrically within both (a) a lateral plane that includes the viewing axes of the two displays and (b) an orthogonal sagittal plane. If the directional contrast is similar between the left and right display screens, directional contrast asymmetries within the lateral plane can be balanced between the left and right eyes of users over a range of interpupillary distances by rotating one of the display screens with respect to the other. If the directional contrast is different between the left and right display screens, the display screens can be paired so that the directional contrast asymmetries within the lateral plane can be at least partially balanced between the left and right eyes of users. Directional contrast asymmetries in the sagittal plane of matching left and right display screens, which are generally not imbalanced by variations in interpupillary distances, can be subject to imbalance by relatively rotating the two display screens. However, the left and right display screens can be relatively translated in the direction of the sagittal plane to reduce the imbalance.

DETAILED DESCRIPTION

Figure 1:
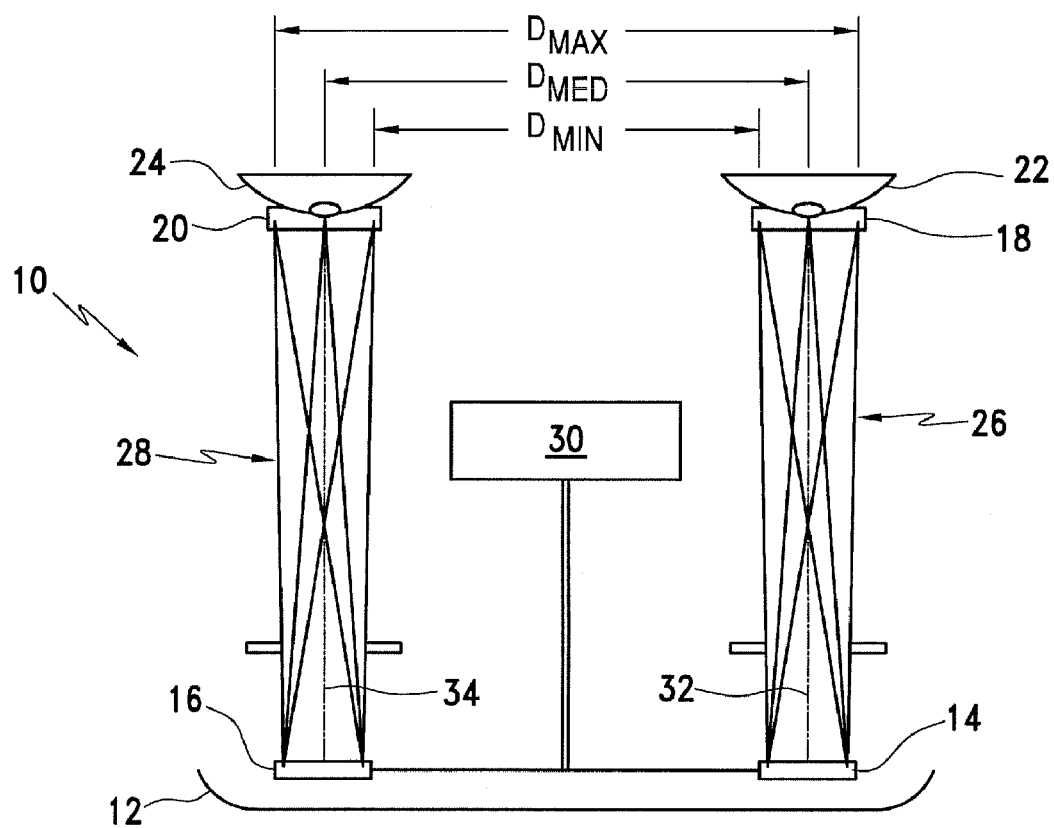
FIG. 1 is an overhead diagram of a binocular display showing a range of interpupillary distances at which left and right display screens can be viewed.

A binocular display 10 is depicted in FIG. 1 for purposes of reference. Within a common housing 12, left and right display screens 14 and 16 are visible within left and right eyeboxes 18 and 20 to left and right eyes 22 and 24 of a user. Optical systems 26 and 28 preferably include focusing optics (not shown) for producing magnified virtual images of the display screens 14 and 16 visible within the eyeboxes 18 and 20.

The display screens 14 and 16 are preferably compact high-resolution image generators capable of producing real images in a still or moving form containing more information than can be normally discerned by the human eye without magnification. Backlit liquid crystal displays (LCDs) are preferred for these purposes, such as Kopin 230K CyberDisplays PN#KCD-QDLF-M from Kopin Corporation of Massachusetts mounted with a fixed interpupillary distance of 63.5 mm and a 24 degree diagonal field of view through a conventional optical lens system. However, a variety of other display screens can be used including liquid crystal on silicon (LCOS) displays, organic light emitting diodes (OLEDs), field emission displays (FEDs), and cathode ray tubes (CRTs).

Each of the display screens 14 and 16, together with their respective optical systems 26 and 28, forms a micro-display engine for relaying images produced by the display screens 14 and 16 to their respective eyeboxes 18 and 20. Examples of such micro-display engines are disclosed in U.S. Patent Application Publication 2005/0180021 (Travers), entitled "Micro-Display Engine", which is hereby incorporated by reference. The display screens 14 and 16 preferably include individually addressable pixels for producing images, such as those transferable from digital files or other image sources 30, including both on-board or off-board drivers. Examples of such image sources include DVD players, A/V cell phones, multi-media players, and game consoles. The optical systems 26 and 28 preferably include reflective focusing optics (not shown) for magnifying the images produced by the display screens 14 and 16 as virtual images and beamsplitters (not shown) for folding the optical paths between the display screens 14 and 16 and the eyeboxes 18 and 20 to provide more compact configurations.

The eyeboxes 18 and 22 define linear orthogonal dimensions within which the user's eyes 22 and can be relatively moved normal to the viewing (i.e. optical) axes 32 and 34 of the optical systems 26 and 28 while the images produced by the display screens 14 and 16 remain fully visible. Eyeboxes measuring at least 8 millimeters by 13 millimeters are preferred for most head-mounted binocular displays.

The display screens 14 and 16 can be viewed through a range of viewing angles within the eyeboxes 18 and 20 for accommodating a population of users having different interpupillary distances (IPDs) between their left and right eyes. For example, the user's eyes 22 and 24 of FIG. 1, which are located in the middle of their respective eyeboxes 18 and 20, have a median interpupillary distance $D_{MED}$ of approximately 61 millimeters. Minimum and maximum interpupillary distances $D_{MIN}$ and $D_{MAX}$, spanning a range from approximately 52 centimeters to 72 millimeters, also fit within the eyeboxes 18 and 20 for accommodating most of the adult population.

Figure 2:
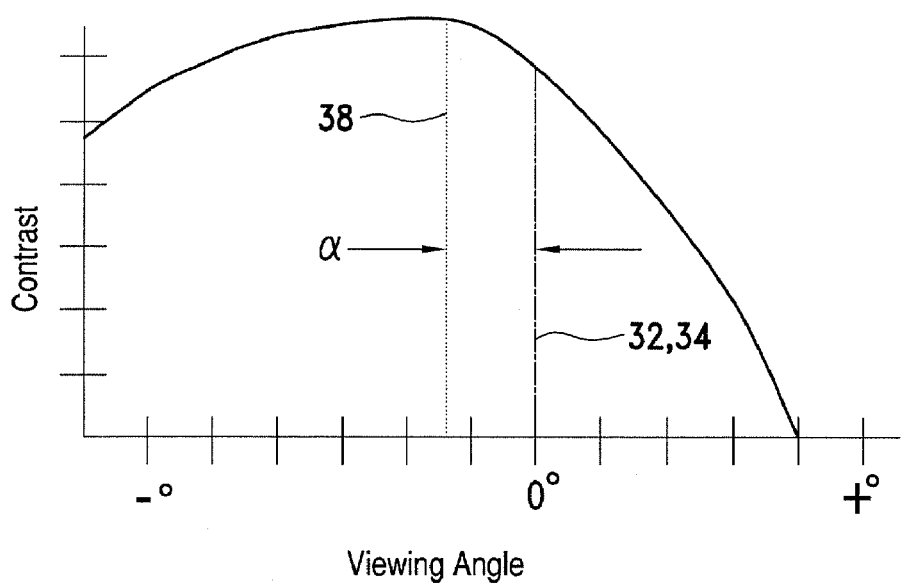
FIG. 2 is a graph of contrast as a function of viewing angle plotting an asymmetric distribution of contrast in opposite directions from a viewing angle of maximum contrast.

A characteristic of some display screens, particularly liquid crystal displays (LCDS) is that image contrast, which is the apparent difference in brightness between light and dark areas of an image, varies asymmetrically with viewing angle. For example, as shown in the graph of FIG. 2, a direction of peak contrast 38 occurs at a viewing angle that is angularly separated from the viewing axis 32 or 34 through an inclination angle α (e.g., 12 degrees). In addition, the contrast decreases asymmetrically for viewing angles on either side of the direction of peak contrast 38. For example, as more negative viewing angles are approached, the contrast decreases quite gradually, but as more positive viewing angles are approached, the contrast decreases precipitously.

Figure 3:
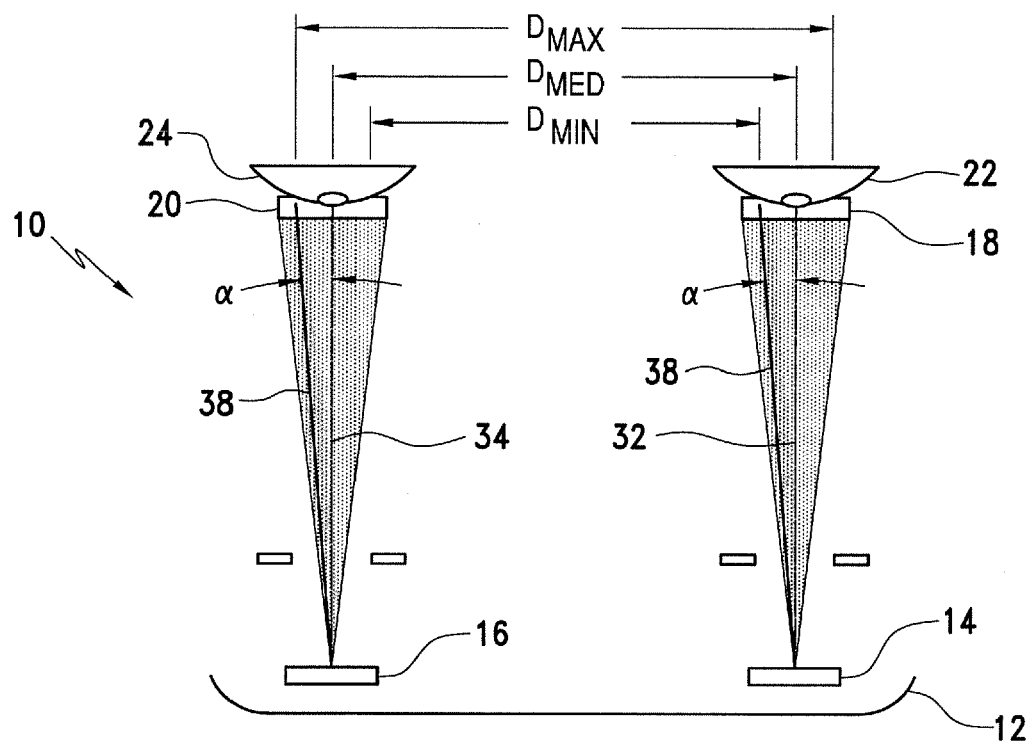
FIG. 3 is an overhead diagram of the binocular display depicting a direction of maximum contrast inclined to viewing axes of the display screens for a set of eyes spaced at an average interpupillary distance.
Figure 4:
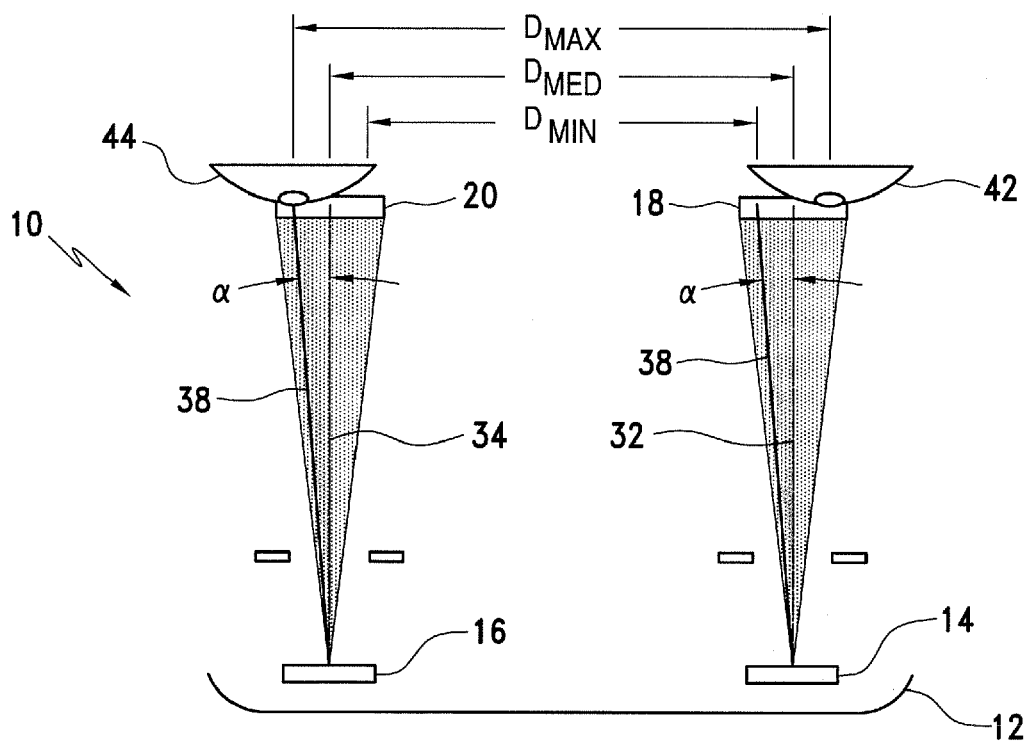
FIG. 4 is an overhead diagram of the same binocular display referenced with respect to a set of eyes spaced at a near maximum interpupillary distance accommodated by the display.

FIGS. 3 and 4 demonstrate how such an asymmetric variation in display contrast can be balanced between one user's eyes 22 and 24 at the median interpupillary distance $D_{MED}$, yet the same asymmetric variation in display contrast can be imbalanced between another user's eyes 42 and 44 at other interpupillary distances such as at the maximum interpupillary distance $D_{MAX}$ shown in FIG. 4. With contrast depicted by shading, i.e., darker shading corresponding to higher contrast, both of the user's eyes 22 and 24 in FIG. 3 are presented with approximately the same contrast. Thus, the contrast is balanced between the left and right eyes 22 and 24 at the median interpupillary distance $D_{MED}$. However, at larger or smaller interpupillary distances, such as at the maximum interpupillary distance $D_{MAX}$ shown in FIG. 4, the left and right eyes 42 and 44 are presented with different amounts of contrast. That is, the same asymmetric variation in contrast exhibited by the left and right display screens 14 and 16 results in the left eye 42 of the user having a maximum interpupillary distance $D_{MAX}$ being presented with much less contrast than the right eye 44 of the same user. On the other hand, the left eye of a user having a minimum interpupillary distance $D_{MIN}$ would be presented with much less contrast than the right eye of the same user. The contrast disparity between users' left and right eyes is attributable to the asymmetric distribution of contrast about the direction of peak contrast 38 but can be further aggravated by when the direction of peak contrast 38 is inclined as shown to the viewing axis 32 or 34 through the angle α.

Figure 5:
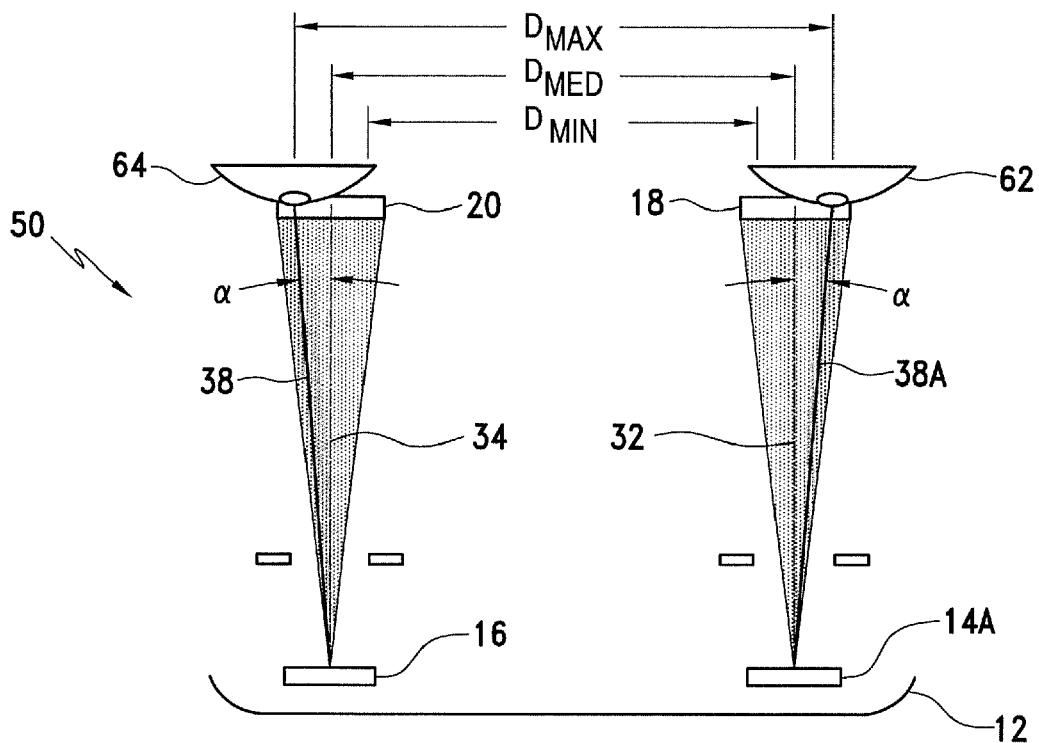
FIG. 5 is an overhead diagram of a modified binocular display with one display screen rotated with respect to another for balancing contrast referenced with respect to a set of eyes spaced at a near maximum interpupillary distance accommodated by the display.
Figure 6:
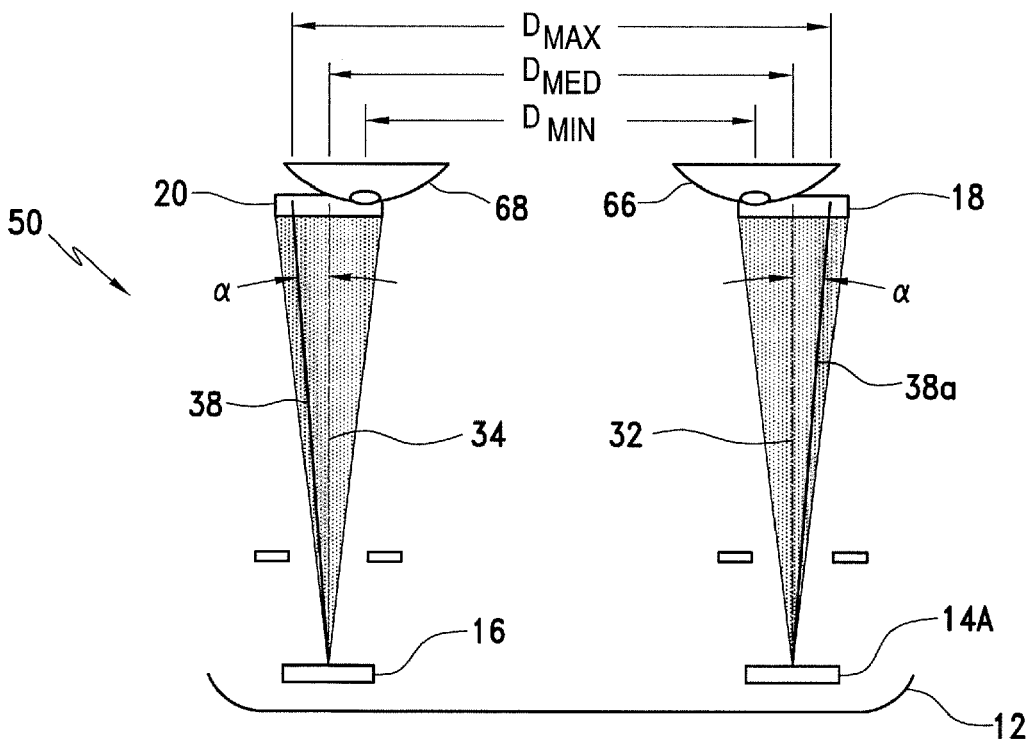
FIG. 6 is an overhead diagram of the modified binocular display with one display screen rotated with respect to another for balancing contrast referenced with respect to a set of eyes spaced at a near minimum interpupillary distance accommodated by the display.
Figure 7:
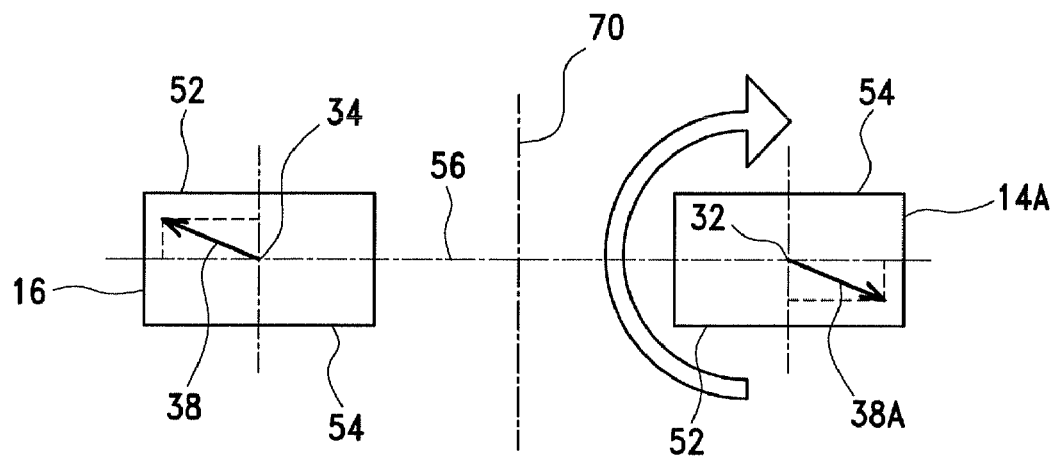
FIG. 7 is a schematic front of the two display screens, depicting the rotation of one screen with respect to the other for balancing contrast in a lateral plane.

FIGS. 5 and 6 depict an alternative binocular display 50 having similarly referenced elements in common with the binocular display 10 but having the display screen 14, now referenced as 14A, which is inverted (i.e. rotated through 180 degrees about its viewing axis 32) with respect to the orientation of the display screen 14 in the binocular display 10. FIG. 7 depicts the rotation of the display screen 14A with respect to the display screen 16 through 180 degrees and shows the effect of the rotation on the direction of peak contrast 38 in the form of a reverse (left-to-right, right-to-left) symmetry, where the new direction of peak contrast 38A extends in an opposite direction. Although the directions of peak contrast 38 and 38A of the display screens 16 and 14A are both directed outwardly, the directions of peak contrast 38 and 38A could also be directed inwardly (i.e., including lateral components directed toward each other), which may be preferable for some users.

Figure 8:
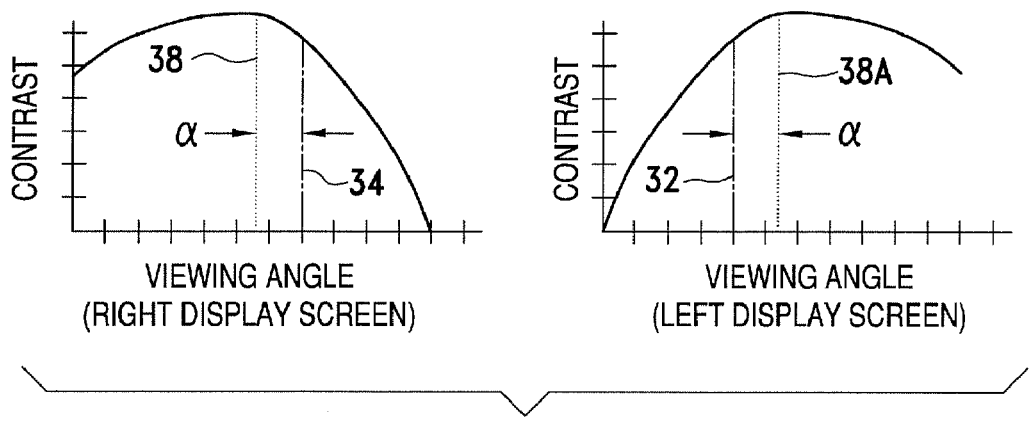
FIG. 8 includes a pair of graphs showing asymmetric variations in contrast oriented in opposite directions between the left and right display screens.

Originally, both displays 14A and 16 were manufactured substantially identically each with a designated top and bottom 52 and 54, a common direction of peak contrast 38, and a common profile of contrast asymmetry about the direction of peak contrast 38. The contrast profile shown in FIG. 2 is considered within a lateral plane 56 that includes the respective viewing axes 32 and 34 of the display screens 14A and 16. Accordingly, when the display screen 14A is rotated as shown, the contrast profile of the display screen 14A is reversed in the lateral plane 56 as shown in FIG. 8. Signals for addressing individual pixels of the display screen 14A must be similarly rearranged so that the original bottom 54 of the display screen 14A is addressed as its top and original top 52 of the display screen 14A is addressed as its bottom.

As exemplified by FIGS. 5 and 6, the variation of contrast with viewing angle in the lateral plane 56 of the binocular display 50 is balanced between left and right eyes 62 and 64 or 66 and 68 over a range of different interpupillary distances. In FIG. 5, the user's eyes 62 and 64 are spaced apart at the maximum interpupillary distance $D_{MAX}$, where both eyes 62 and 64 are within regions of similar high contrast. In FIG. 6, the user's eyes 66 and 68 are spaced apart at the minimum interpupillary distance $D_{MIN}$, where both eyes 66 and 68 are within regions of similar low contrast. Although high contrast is preferred over low contrast, the balance in contrast between the left and right eyes 62 and 64 or 66 and 68 avoids the eyestrain, headaches, and other discomforts associated with the type of imbalanced contrast apparent from the binocular display 10 for users with interpupillary distances that depart from average, such as shown in FIG. 4. In addition, the contrast-balanced binocular display 50 affords the possibility for extended viewing times over a wide range of interpupillary distances. The display screens 14A and 16 can be slightly inclined or offset to the eyeboxes 18 and 20 to more evenly balance contrast between the minimum and maximum interpupillary distances $D_{MIN}$ and $D_{MAX}$.

Figure 9:
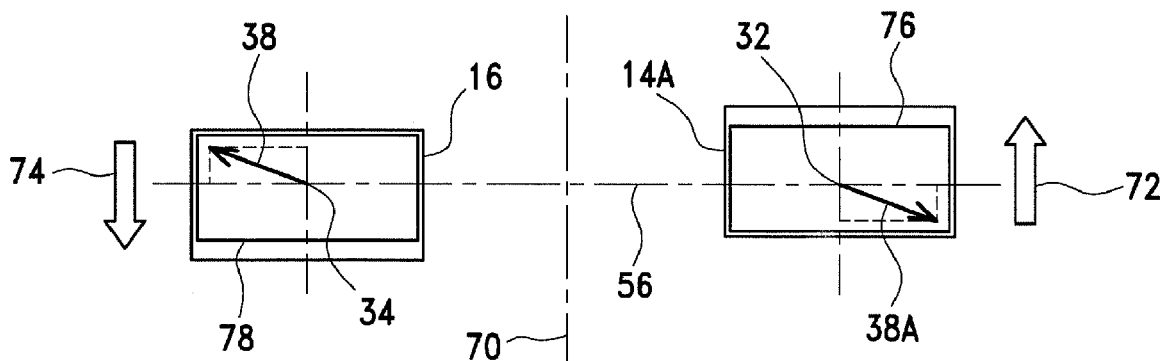
FIG. 9 is a schematic front of the two relatively rotated display screens, depicting the offset of one screen with respect to the other for balancing contrast in a sagittal plane.

The asymmetric variation in contrast with viewing angle can also include contrast asymmetries on either side of the direction of peak contrast 38 in an orthogonal sagittal plane 70. Directional contrast asymmetries in the sagittal plane 70 of matching left and right display screens 14 and 16 are generally not imbalanced by variations in interpupillary distances, but can be subject to imbalance by relatively rotating the two display screens 14A and 16 as shown in FIGS. 5-7. However, as shown in FIG. 9, the left and right display screens 14A and 16 can be relatively translated in the direction of arrows 72 and 74 to reduce the imbalance. The relative translation reduces the overlayable working areas of the display screens to the areas 76 and 78, which are balanced with respect to the lateral plane 56.

Although described as a modification to a binocular display having substantially identical display screens 14 and 16, the invention can also be practiced as a binocular display having display screens that exhibit different asymmetric contrast variations about their directions of peak contrast. For example, such display screens can be grouped in pairs according to their asymmetric contrast characteristics so that their contrast asymmetries with viewing angle approach mirror symmetry within a common lateral plane of the paired display screens. In this way, the changes in contrast within the left and right eyeboxes accompanying changes in interpupillary distances remain more substantially the same for both eyes of a user.

What is claimed is:

1. A binocular display comprising left and right display screens for the left and right eyes of a user, each display screen having a characteristic optical contrast that varies with the viewing angle, the contrast being maximum at a first viewing angle and decreasing unsymmetrically for viewing angles greater or lesser than the first viewing angle, the display screens being mounted with respect to a user such that the change in contrast with viewing angle trends opposite for the left and right display screens;

the display screens exhibiting a similar characteristic contrast, one of the display screens being rotated with respect to the other display screen, and left and right signal source being coupled to the left and right display screens and being adapted to accommodate the relative rotation between the display screens so that the left and right signals produce right side up images on both the left and right display screens.

2. A binocular display comprising left and right display screens being mounted within a viewing device for viewing along respective viewing axes, each of the display screens exhibiting a directionally sensitive contrast that varies asymmetrically from a direction of peak contrast within a lateral plane that includes the respective viewing axes, the asymmetric contrasts exhibited by the left and right display screens being oriented in opposite directions within the lateral plane, the left and right display screens exhibiting similar asymmetric contrasts, and one of the display screens being rotated with respect to the other of the display screens to orient the asymmetric contrasts of the left and right display screens in opposite directions within the lateral plane, wherein the one display screen is rotated with respect to the other display screen to produce a substantially reverse symmetry between the asymmetric contrasts exhibited by the two display screens.

3. A binocular display comprising left and right display screens being mounted within a viewing device for viewing along respective viewing axes, each of the display screens exhibiting a directionally sensitive contrast that varies asymmetrically from a direction of peak contrast within a lateral plane that includes the respective viewing axes, and the asymmetric contrasts exhibited by the left and right display screens being oriented in opposite directions within the lateral plane, wherein the left and right display screens exhibit different asymmetric contrasts, and the display screens are oriented so that the asymmetric contrasts approach mirror symmetry with respect to each other.

4. A binocular display comprising left and right display screens mounted within a viewing device for viewing by corresponding left and right eyes of users, both of the display screens having a predetermined top to bottom orientation and exhibiting a similar directionally sensitive contrast that varies asymmetrically with respect to a direction of peak contrast, and one of the left and right display screens being rotated with respect to the other of the display screens within the viewing device so that the asymmetric contrasts are oriented in different directions with respect to the left and right eyes of the users for reducing differences in contrast presented to the left and right eyes of the users over a range of different interpupillary distances.

5. The binocular display of claim 4 in which the left and right display screens are relatively translated out of a lateral alignment with one another to further reduce differences in contrast presented to the left and right eyes of the users.

6. A binocular display comprising first and second display screens mounted within a viewing device having first and second eyeboxes within which the respective first and second display screens are visible to users, the first and second display screens having first and second viewing axes directed toward the first and second eyeboxes, each of the first and second display screens exhibiting a direction of peak contrast that is inclined to the respective first and second viewing axes, and the first display screen being oriented with respect to the second display screen so that the directions of peak contrast extend in different directions with respect to the first and second viewing axes to reduce contrast variations apparent between the different eyes of the users over a range of interpupillary distances.

7. The binocular display of claim 6 in which the first display screen is rotated with respect to the second display screen to orient the peak contrasts of the first and second display screens in opposite directions.

8. The binocular display of claim 6 in which contrast exhibited by the first and second display screens is a directionally sensitive contrast that varies asymmetrically with respect to the directions of peak contrast.

9. The binocular display of claim 6 in which the asymmetric contrasts also preferably extend in different directions with respect to the left and right eyes of the users.

10. The binocular display of claim 6 in which the left and right display screens are relatively translated out of a lateral alignment with one another to further reduce differences in contrast presented to the left and right eyes of the users.

* * * * *

UNITED STATES PATENT AND TRADEMARK OFFICE
CERTIFICATE OF CORRECTION

| | | |
|---|---|---|
| PATENT NO. | : 7,515,344 B2 | Page 1 of 1 |
| APPLICATION NO. | : 11/306616 | |
| DATED | : April 7, 2009 | |
| INVENTOR(S) | : Paul J. Travers | |

It is certified that error appears in the above-identified patent and that said Letters Patent is hereby corrected as shown below:

On the cover sheet, in column one, following "(73) Assignee:" kindly change "Vuzlx" to --Vuzix--.

Signed and Sealed this

Second Day of June, 2009

JOHN DOLL
*Acting Director of the United States Patent and Trademark Office*